April 27, 1948.   H. G. LEHMANN   2,440,409
BRACKET MOUNTING
Filed Dec. 2, 1941
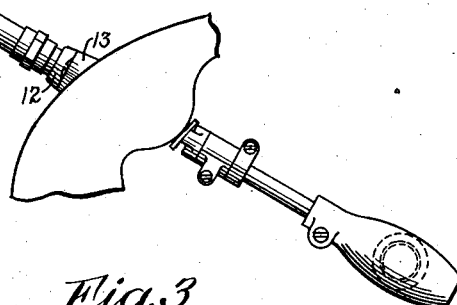
Fig.1
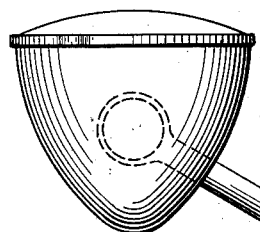
Fig.2
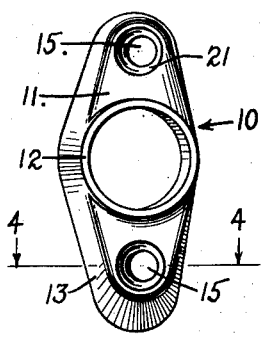
Fig.3
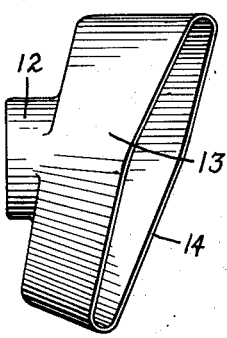
Fig.5
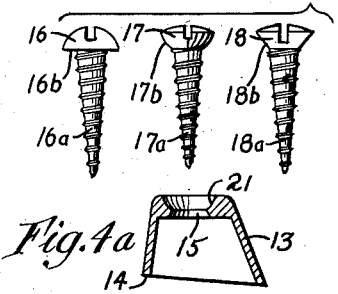
Fig.4a
Fig.4
Fig.6
Fig.7
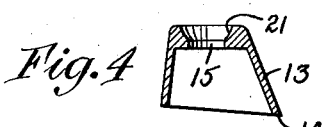
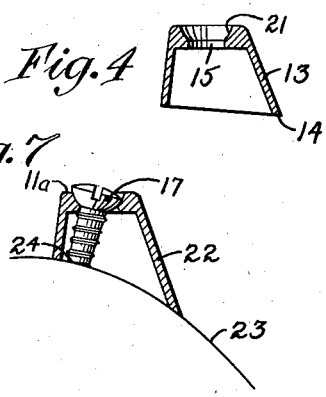
Fig.8
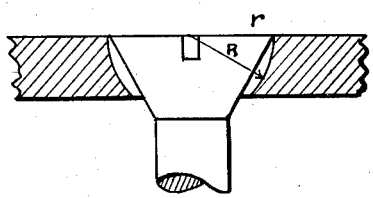
INVENTOR
Herbert G. Lehmann
BY
ATTORNEYS Patented Apr. 27, 1948

2,440,409

UNITED STATES PATENT OFFICE 2,440,409

BRACKET MOUNTING

Herbert G. Lehmann, Bridgeport, Conn.

Application December 2, 1941, Serial No. 421,293

5 Claims. (Cl. 248—226)

The present invention relates to improved means for fastening brackets, escutcheons, etc., to supporting surfaces of different irregular contours.

Brackets or escutcheon plates are widely used for mounting accessory devices such as lamps, mirrors, spotlights, radio antennas, etc., on the bodies of vehicles, such as automobiles. The surfaces to which such brackets are fastened are usually of widely differing irregular shapes, and often in mounting an escutcheon or bracket thereon, the face of the escutcheon forms a relatively wide angle with the general slope of the supporting surface.

To insure adequately firm support for the escutcheon plate, a skirt or flange is generally provided thereon having its edge shaped to engage the supporting surface at at least three points. Preferably, however, the flange or skirt is shaped so that its entire circumference engages the supporting surface. For example, in a copending application, Serial No. 409,372, filed September 3, 1941, now Patent No. 2,395,215 granted February 19, 1946, there is disclosed a universal blank for escutcheon plates to be mounted on the front posts of automobiles, especially adapted for mounting spotlights thereon and a method of shaping the edge of the flange of the escutcheon blank to make it conform to a wide variety of irregular surfaces. The escutcheon or its blank of said application is provided with a pair of screw-receiving holes in its face through which screws or bolts are inserted to engage the supporting surface, clamping the edge of the flange against the surface.

In applying these brackets, however, difficulty has been encountered in that workmen usually do not use the precision necessary to line up the screw with the direction of the force tending to clamp the bracket to the surface so that when the bracket is drawn into clamping relation with the supporting surface it moves laterally in an effort to so align the screw with the direction of force. This is particularly true when screws or bolts having conical or flat seats are employed in plain apertures or those having conical countersunk recesses thereabout.

In addition to tending to shift the bracket, the screws or bolts when so positioned have contact with one or two points of the countersunk surface and may damage this surface sufficiently to tear it out and release the head of the screw or bolt.

According to the present invention, these difficulties have been overcome by providing the screw or bolt-receiving holes in the bracket with a concave spherically shaped countersunk portion having a diameter slightly greater than the diameter of the head of the screw at its widest point. By this means, the edge of the screw or bolt head forms a line contact rather than a point contact with the countersunk surface, regardless of the angle which its axis makes with the axis of the hole, and a screw or bolt may be applied at any angle to the face of the bracket and the underlying surface, required to align its axis with the resultant of the reactive forces supporting the edge of the escutcheon skirt, within limits determined solely by the clearance between the shank of the screw or bolt, and the narrowest part of the hole.

Angular displacement of the screw or bolt in its spherical seat or relative to the axis of the countersunk apertures does not disturb the aforesaid line engagement of the head therewith. Thus, the bracket or escutcheon can be fastened in such a manner that there is no tendency toward lateral displacement thereof upon tightening the screw or bolt, and a firm, stable support for an accessory is thereby provided.

The underside of the head of the screw or bolt need not be conical, but may be flat, provided its diameter permits it to enter the countersunk seat. If desired, the screw or bolt may be made with a convex spherical shoulder on the underside of its head, of the same radius of curvature as the countersunk portion of the hole in the bracket. This results in a ball-and-socket joint providing a surface contact rather than a line contact between the head of the screw and the countersunk surface or seat.

In the accompanying drawings which illustrate the invention:

Figure 1 is a view showing a dirigible spotlight secured to a portion of the body of an automobile by means of an escutcheon or bracket according to the present invention.

Fig. 2 is a front view of a blank for an escutcheon or bracket according to the present invention adapted for use in conjunction with the spotlight of Fig. 1.

Fig. 3 is a side view of the escutcheon blank of Fig. 2.

Fig. 4 is a cross-section of the escutcheon blank along the line 4—4 of Fig. 2.

Fig. 4a is a view similar to Fig. 4, showing a modified form of the invention.

Fig. 5 is a side view of three forms of self-tapping screws adapted for use with an escutcheon made from the blank of Figs. 2 to 4.

Fig. 6 is a view of the escutcheon of Fig. 1 applied to a supporting surface by means of one of the self-tapping screws of Fig. 5.

Fig. 7 is a view similar to Fig. 6 showing the application of another screw of Fig. 5.

Fig. 8 is a view of the head in the countersink showing the relationship between the radius of the head and the radius of curvature of the countersink.

The escutcheon blank 10 shown in Figs. 2 and 3, which is made of some suitable rigid material, such as metal, comprises a face plate 11 having a collar 12 projecting therefrom in one direction, and a flange or skirt 13 projecting in the the opposite direction. The edge 14 of the said flange is preferably shaped so that the length of the skirt at any circumferential point is at least sufficient to reach the lowest corresponding point on a number of different irregular supporting surfaces to which escutcheons made from the said blank are to be secured, as disclosed in said co-pending application.

When it is desired to make an escutcheon from the blank 10 for any given supporting surface, portions of the skirt 13 are cut away, for instance, by filing or milling, in accordance with a flexible template, applicable therein, so that the skirt of the escutcheon will contact the supporting surface at substantially all points and thereby provide a firm support therefor.

A pair of screw or bolt-receiving holes 15 is provided in the face plate or portion 11 of the escutcheon blank 10, said holes being adapted to receive, for instance, the circular-headed self-tapping screws 16, 17 or 18 shown in Fig. 5, or bolts with similarly shaped circular heads.

Each of the screws has a shank 16a, 17a or 18a, with self-tapping threads formed in the usual manner. The screw 16 is of the round-headed type having a flat shoulder 16b on the lower side of its head. The screw 18 is of the oval-headed type having a standard conical shoulder 18b on the lower side of the head, the apex angle of the conical surface being about 82°. Screw 17 is of a special type having a convex spherical surface 17b on the lower side of its head, the radius of curvature R of which is slightly greater than the radius r of the head, as shown in Fig. 8.

According to the present invention, the holes 15 in the face 11 of the blank or escutcheon 10 are countersunk as indicated in Fig. 4, the countersunk portion 21 having a concave spherical shape, so constructed that it will be engaged by the edge of the head of screws 16 or 18. To satisfy this condition, the radius of curvature of the spherical surface 21 and the radius of the countersink at its upper edge must be at least equal to the radius of the heads of screws 16, or 18 adapted to be received thereby.

In Figs. 6 and 7, the method of mounting an escutcheon 22, made from the blank 10, on a supporting surface 23 is illustrated. The latter is of sheet metal as is usual in automobile body constructions. Holes 24 are drilled in the supporting surface. The hole is located by supporting the bracket in position on the surface and passing a prick-punch through the hole 15 with the punch substantially normal to the surface and tapping the same. The hole is then drilled in accordance with the impression from the prick-punch.

Referring to Fig. 6, the screw 18 (or 16) is inserted through hole 15 and threaded into the drilled hole 24. As the head of the screw engages the countersunk spherical surface, a line contact is formed with the head of the screw. Bolts having heads similar to screws 16 or 18 may be inserted in the same manner, a nut being applied to the end of the bolt protruding through the sheet metal surface.

In practice, it is merely necessary to locate the drilled aperture 24 approximately to fulfill the aforesaid ideal or desired condition, since slight deviations therefrom will be corrected, at most, by slight shifting of the escutcheon on the surface 23 upon tightening of a screw inserted in the apertures 15 and 24.

The screw head is firmly supported by line contact on the spherical countersunk surface and since the axis of the screw coincides substantially with the forces applied and supported thereby, the tightening of the screw has no tendency to shift its angular position or to move the escutcheon laterally on the sheet metal supporting surface 23 to which it is applied.

The maximum angle which the inserted screw can make with the axis of the aperture 15 is limited by engagement of its shank with the edge of the hole at the inner surface of the face portion 11 or 11a of the escutcheon. The wider the aperture 15 is made and the more nearly the spherical countersunk portion 21 approaches the undersurface of the face portion 11a of the escutcheon 22, the greater the maximum possible angular displacement of the screw from the axis of the aperture becomes. In order to increase this angle, the aperture 15 may be conically countersunk on the undersurface of the face portion of the escutcheon as indicated in Fig. 4a.

Standard screws or bolts having oval or flat circular heads, and a conical shoulder on the underside of the head, are normally constructed so that the apex angle of the conical surface is 82°. The diameter of the shank where it joins the conical shoulder is generally slightly greater than half the diameter of the top of the head. The depth of the conical shoulder is slightly more than half the diameter of the shank.

In order to provide an aperture capable of receiving as wide a range of sizes of standard conically headed screws as possible, the maximum diameter of the countersink is preferably made not less than 99% of the radius of curvature of the spherical countersink. The diameter of the aperture 15 may be as great as 80% of the maximum diameter of the countersink and preferably about 70% to 80% to permit angular displacement of standard conically or spherically headed screws of suitable sizes. The depth of the aperture 15 below the base of the countersunk portion, if cylindrical, as illustrated in Fig. 4, is preferably made not substantially greater than half the depth of the spherical countersink 21.

It is not necessary that the escutcheon or like fastening means be constructed in one piece. For instance, the spherically countersunk aperture 21 may be formed if desired in a separable member forming a face portion of the escutcheon when it is applied, said member taking the form of a washer or the like.

Variations and modifications may be made within the scope of this invention and portions of the improvements may be used without others.

I claim:

1. A bracket to be clamped to a supporting surface by a screw or bolt having a head of predetermined radius comprising a face plate having an aperture therein provided with a countersink and having a depending skirt of uneven width for engaging, and positioning said bracket on, the supporting surface with the face plate in angular relation thereto, the surface of the countersink being spherical and having a radius of curvature greater than the radius of the head of the said screw or bolt to provide a bearing surface for the head when the screw or bolt is normal to the supporting surface.

2. In combination, a bracket comprising a face plate having an aperture therein provided with a countersink and having means spaced uneven distances from said face plate for engaging an angularly disposed supporting surface to support the face plate in angular relation thereto, the surface of the countersink being spherical; and fastening means passing through the aperture and into the supporting surface, said fastening means being provided with a head for insertion into engagement with the surface of the countersink and having a radius less than the radius of curvature of the spherical surface to provide a bearing surface for the head when the fastening means is normal to the angular supporting surface.

3. A bracket to be clamped to an angularly disposed supporting surface by a screw or bolt having a head of predetermined radius and a conical shoulder on the underside of the head comprising a face plate having an aperture therein provided with a countersink, and support engaging surfaces spaced uneven distances from the face plate to support the face plate in angular relation to the angularly disposed supporting surface, the surface of the countersink being spherical and having a radius of curvature greater than the radius of the head of the said screw or bolt to provide a bearing surface having at least line contact with the head when the screw or bolt is normal to the angular supporting surface.

4. In combination, a bracket comprising a face plate having an aperture therein provided with a countersink and having a depending skirt of uneven width for engaging, and positioning said bracket on, a supporting surface with the face plate in spaced angular relation thereto, the surface of the countersink being spherical; and fastening means passing through the aperture and into the supporting surface to clamp the bracket thereto, said fastening means being provided with a head for insertion into the countersink and for engagement with the surface thereof, said head having a radius less than the radius of curvature of the spherical surface, the spherical surface of the countersink providing at least a line contact bearing surface for the head when the fastening means is moved into a position wherein the fastening means lies in the shortest path between the face plate and supporting surface.

5. In combination, a bracket comprising a face plate having an aperture therein provided with a countersink and having a depending skirt of uneven width for engaging, and positioning said bracket on, a supporting surface with the face plate in spaced angular relation thereto, the surface of the countersink being spherical; and fastening means passing through the aperture and into the supporting surface to clamp the bracket thereto, said fastening means being provided with a head for insertion into the countersink and for engagement with the surface thereof, said head having a radius less than the radius of curvature of the spherical surface and a conical shoulder under the head, the spherical surface of the countersink providing at least a line contact bearing surface for the head when the fastening means is moved into a position wherein the fastening means lies in the shortest path between the face plate and supporting surface.

HERBERT G. LEHMANN.

REFERENCES CITED

The following references are of record in the file of this patent:

UNITED STATES PATENTS

| Number | Name | Date |
| --- | --- | --- |
| Re. 14,796 | Mennie | Jan. 27, 1920 |
| 1,352,918 | Rohbock | Sept. 14, 1920 |
| 1,519,678 | Gates | Dec. 16, 1924 |
| 1,532,099 | Anderson | Mar. 31, 1925 |
| 1,886,271 | Hoke et al. | Nov. 1, 1932 |
| 1,940,348 | Gross | Dec. 19, 1933 |
| 1,963,799 | Nelson | June 19, 1934 |
| 2,395,215 | Cochrane | Feb. 19, 1946 |

FOREIGN PATENTS

| Number | Country | Date |
| --- | --- | --- |
| 10,814 | Great Britain | 1907 |